United States Patent
Osborne et al.

(10) Patent No.: US 11,396,372 B2
(45) Date of Patent: Jul. 26, 2022

(54) REDUNDANT IMPACT-RESISTANT STRUCTURE

(71) Applicant: Bell Helicopter Textron Inc., Fort Worth, TX (US)

(72) Inventors: John Benjamin Osborne, Colleyville, TX (US); Ramesh Thiagarajan, Plano, TX (US); Charles Joseph Kilmain, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 281 days.

(21) Appl. No.: 16/117,924

(22) Filed: Aug. 30, 2018

(65) Prior Publication Data
US 2020/0070967 A1    Mar. 5, 2020

(51) Int. Cl.
*B64C 27/59* (2006.01)
*B64C 11/20* (2006.01)
*B64C 27/00* (2006.01)

(52) U.S. Cl.
CPC .............. *B64C 27/59* (2013.01); *B64C 11/20* (2013.01); *B64C 27/001* (2013.01)

(58) Field of Classification Search
CPC ........ B64C 27/59; B64C 11/20; B64C 27/001; B64C 13/30; B64C 11/32; B64C 27/54; F16C 3/02; F16C 7/06; B63H 3/00; B63H 3/002; B63H 3/04; B63H 3/12; F16B 7/0406; F16B 7/0413
See application file for complete search history.

(56) References Cited

U.S. PATENT DOCUMENTS

| 2,669,313 A | * | 2/1954 | Lightfoot | B64C 27/59 |
| | | | | 416/1 |
| 2,936,978 A | * | 5/1960 | Lauck | B64D 27/12 |
| | | | | 248/555 |

(Continued)

FOREIGN PATENT DOCUMENTS

FR    2599793 A1    12/1987

OTHER PUBLICATIONS

European Patent Office, "European Search Report," EP Application No. 19190706.2, dated Jan. 31, 2020, 4 pages, published Munich, Germany.

*Primary Examiner* — Medhat Badawi
*Assistant Examiner* — Vicente Rodriguez
(74) *Attorney, Agent, or Firm* — Fogarty LLP (57) ABSTRACT

Embodiments are directed to systems and methods for providing a control link for an aircraft in which the control link comprises an impact-resistant structure with a redundant load path. The control link has an inner structure that is sized to carry the anticipated load of the flight control system and to meet all safety factors. The control link also has an outer structure that is sacrificial and configured to absorb impact damage during operation, thereby protecting the inner structure. The outer structure is also designed to carry the anticipated load of the flight control system on its own, independent of the inner structure, and to meet all safety factors. If the outer structure fails, the inner structure allows for continued safe operation of the flight control system. The space or cavity between the inner and outer structures may be filled with a material, such as a closed-cell foam, to improve the impact resistance of the outer structure.

20 Claims, 6 Drawing Sheets

(56) References Cited

U.S. PATENT DOCUMENTS

| | | | | |
|---|---|---|---|---|
| 4,097,163 | A * | 6/1978 | Dubuque | F16B 39/02 |
| | | | | 29/517 |
| 4,924,043 | A * | 5/1990 | Aubry | G01D 5/04 |
| | | | | 200/52 R |
| 7,207,854 | B1 * | 4/2007 | Anderson, Jr. | B63H 5/125 |
| | | | | 440/53 |
| 8,448,899 | B2 * | 5/2013 | Luce | B64C 25/505 |
| | | | | 244/100 R |
| 2008/0115622 | A1 * | 5/2008 | Uhl | F16C 7/06 |
| | | | | 74/592 |
| 2011/0210229 | A1 * | 9/2011 | Bonnet | F16C 7/04 |
| | | | | 248/557 |
| 2017/0050405 | A1 * | 2/2017 | Stewart | B32B 3/30 |
| 2020/0063788 | A1 * | 2/2020 | Gurvich | B64D 35/00 |

\* cited by examiner

FIG. 8

REDUNDANT IMPACT-RESISTANT STRUCTURE

BACKGROUND

Aircraft control systems comprise a collection of mechanical linkages and equipment connecting cockpit controls to flight control surfaces that allows an aircraft to be flown with precision and reliability. Aircraft control systems may further comprise sensors, actuators (hydraulic, mechanical, or electrical) and computers. Push-pull rods, torque tubes, bell cranks, cables and pulleys are commonly found in conventional mechanical flight control systems. In fixed wing aircraft, the flight control system controls operation for the aircraft's airfoil, elevator, rudder, and other control surfaces. In a rotorcraft, the flight control system controls operation (i.e. pitch) of the rotor blades through a swash plate component. An aircraft or rotorcraft's flight control system is critical to flight safety. Damage or failure of a flight control system component during flight operations often have serious consequences.

SUMMARY

Embodiments are directed to systems and methods for providing a control link for an aircraft in which the control link comprises an impact-resistant structure with a redundant load path. The control link has an inner structure that is sized to carry the anticipated load of the flight control system and to meet all safety factors. The control link also has an outer structure that is sacrificial and configured to absorb impact damage during operation, thereby protecting the inner structure. The outer structure is also designed to carry the anticipated load of the flight control system on its own, independent of the inner structure, and to meet all safety factors. If the outer structure fails, the inner structure allows for continued safe operation of the flight control system. The space or cavity between the inner and outer structures may be filled with a material, such as a closed-cell foam, to improve the impact resistance of the outer structure.

BRIEF DESCRIPTION OF THE DRAWINGS

Having thus described the invention in general terms, reference will now be made to the accompanying drawings, which are not necessarily drawn to scale, and wherein:

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
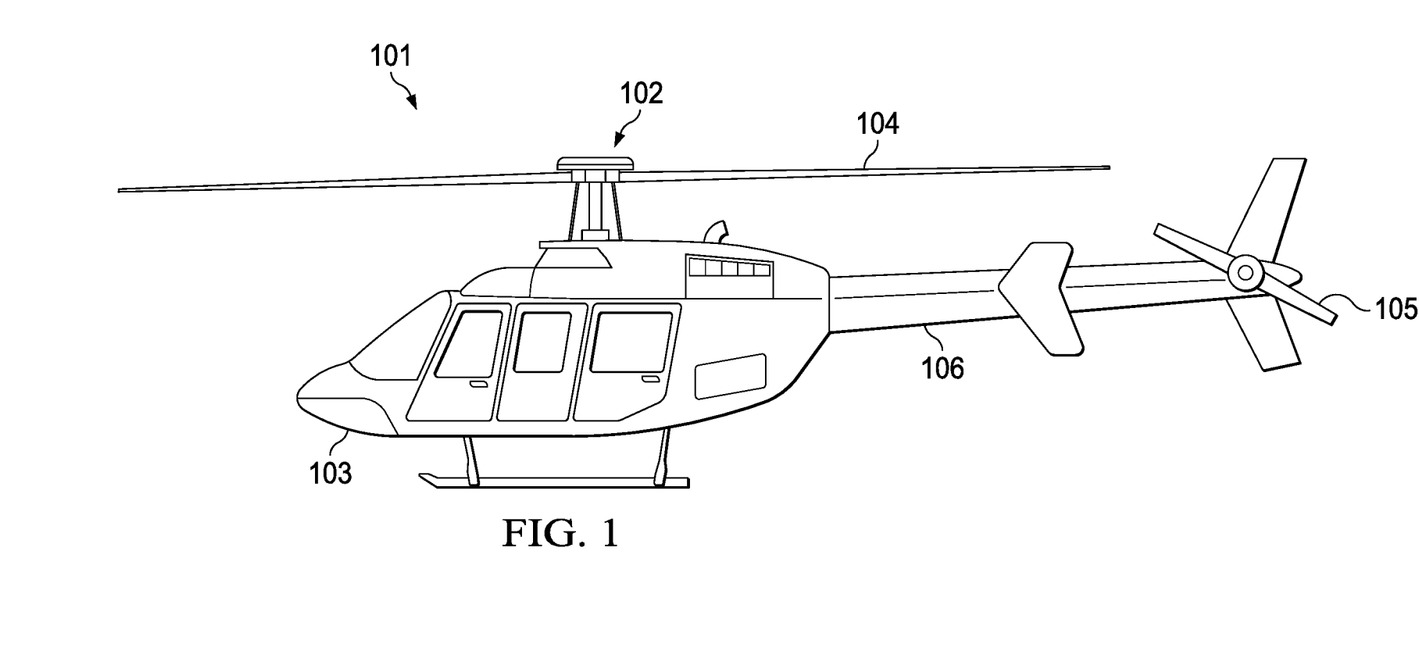
FIG. 1 is a side view of an example helicopter capable of being used with embodiments of the disclosed redundant impact-resistant structures.
Figure 2:
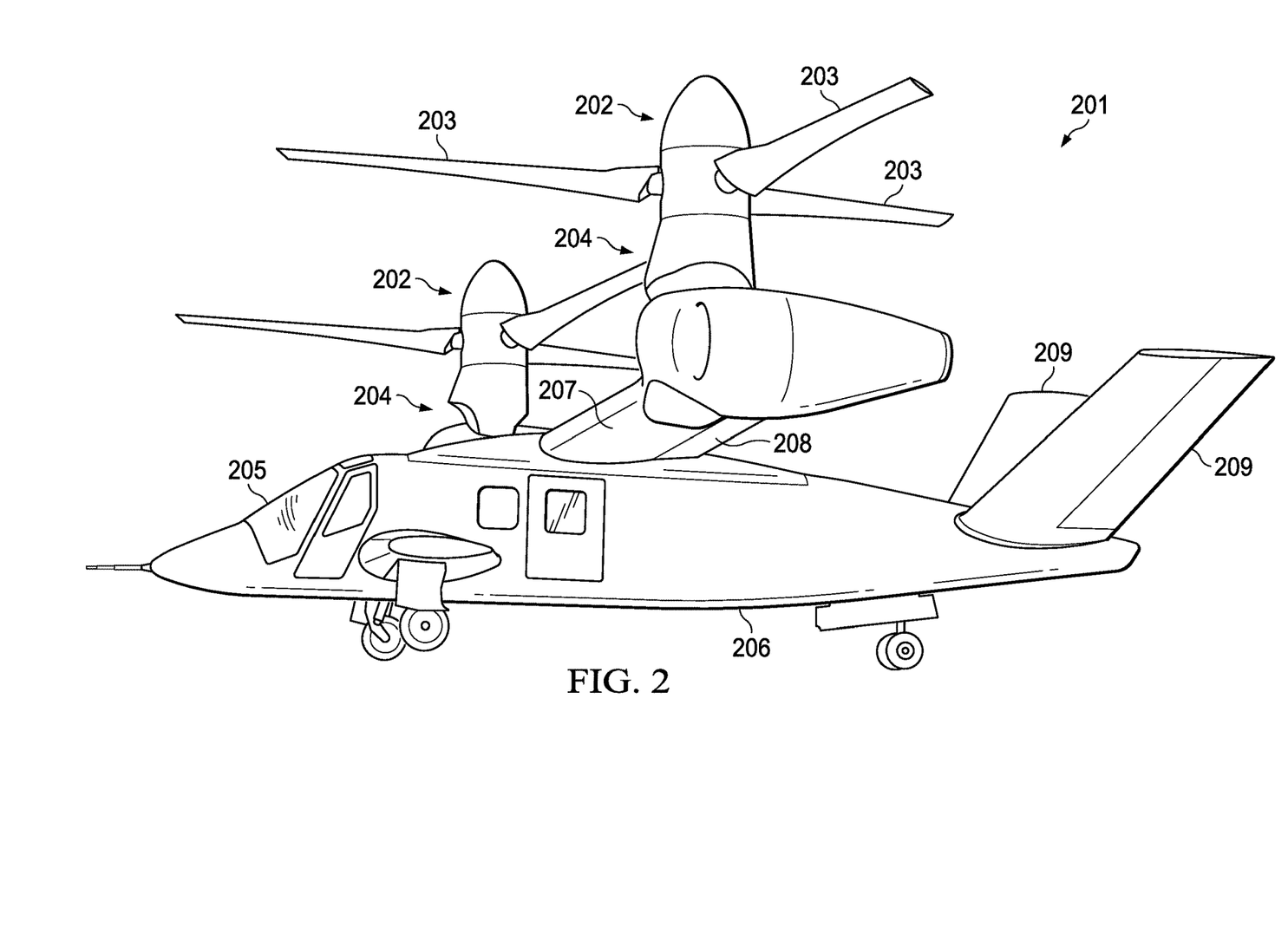
FIG. 2 is an oblique view of an example tiltrotor aircraft capable of being used with embodiments of the redundant impact-resistant structures.

FIGS. 1 and 2 are schematic diagrams of two different rotorcrafts capable of being used with embodiments of the redundant impact-resistant structures disclosed herein. FIG. 1 is a side view of an example helicopter 101, while FIG. 2 is an oblique view of an example tiltrotor aircraft 201. Helicopter 101 includes a rotary system 102 carried by a fuselage 103. Rotor blades 104 connected to the rotary system 102 provide lift to enable flight for helicopter 101. The rotor blades 104 are controlled by multiple controllers within fuselage 103. The pitch of each rotor blade 104 can be manipulated to selectively control direction, thrust, and lift of the helicopter 101. For example, during flight a pilot can manipulate a cyclic controller to change the pitch angle of rotor blades 104 and/or manipulate pedals to provide vertical, horizontal, and yaw flight movement. Helicopter 101 can further include an anti-torque system 105 mounted on an empennage 106.

Tiltrotor aircraft 201 includes two or more rotary systems 202 having multiple proprotors 203 and carried by rotatable nacelles 204. The rotatable nacelles 204 provide means for allowing aircraft 201 to take-off and land like a conventional helicopter, and for horizontal flight like a conventional fixed wing aircraft. Like the helicopter 101, the tiltrotor aircraft 201 includes controls, e.g., cyclic controllers and pedals, carried within the cockpit 205 of fuselage 206, for causing movement of the aircraft and for selectively controlling the pitch of each blade 203 to control the direction, thrust, and lift of tiltrotor aircraft 201.

Although FIG. 2 shows tiltrotor aircraft 201 in a helicopter mode wherein proprotors 203 are positioned substantially vertical to provide a lifting thrust. It will be understood that in other embodiments, tiltrotor aircraft 201 may operate in an airplane mode wherein proprotors 203 are positioned substantially horizontal to provide a forward thrust. Proprotors 203 may also move between the vertical and horizontal positions during flight as tiltrotor aircraft 201 transitions between a helicopter mode and an airplane mode. Wings 207 may provide lift to tiltrotor aircraft 201 in certain flight modes (e.g., during forward flight) in addition to supporting rotatable nacelles 204 and rotary systems 202. Control surfaces 208 on wings 207 and/or control surfaces 209 on a tail section may be used to adjust the attitude of tiltrotor aircraft 201 around the pitch, roll, and yaw axes while in airplane mode. Control surfaces 208 and 209 may be, for example, ailerons, flaps, slats, spoilers, elevators, or rudders that are controlled by cyclic controllers, pedals or other flight controls within cockpit 205 of fuselage 206.

Embodiments of the present disclosure are not limited to any particular setting or application, and embodiments can be used with a rotor system in any setting or application such as with other aircraft, vehicles, or equipment. It will be understood that aircraft 101 and 201 are used merely for illustration purposes and that any aircraft, including fixed wing, rotorcraft, commercial, military, or civilian aircraft, or any other non-aircraft vehicle may use the redundant impact-resistant structures as disclosed herein.

Figure 3:
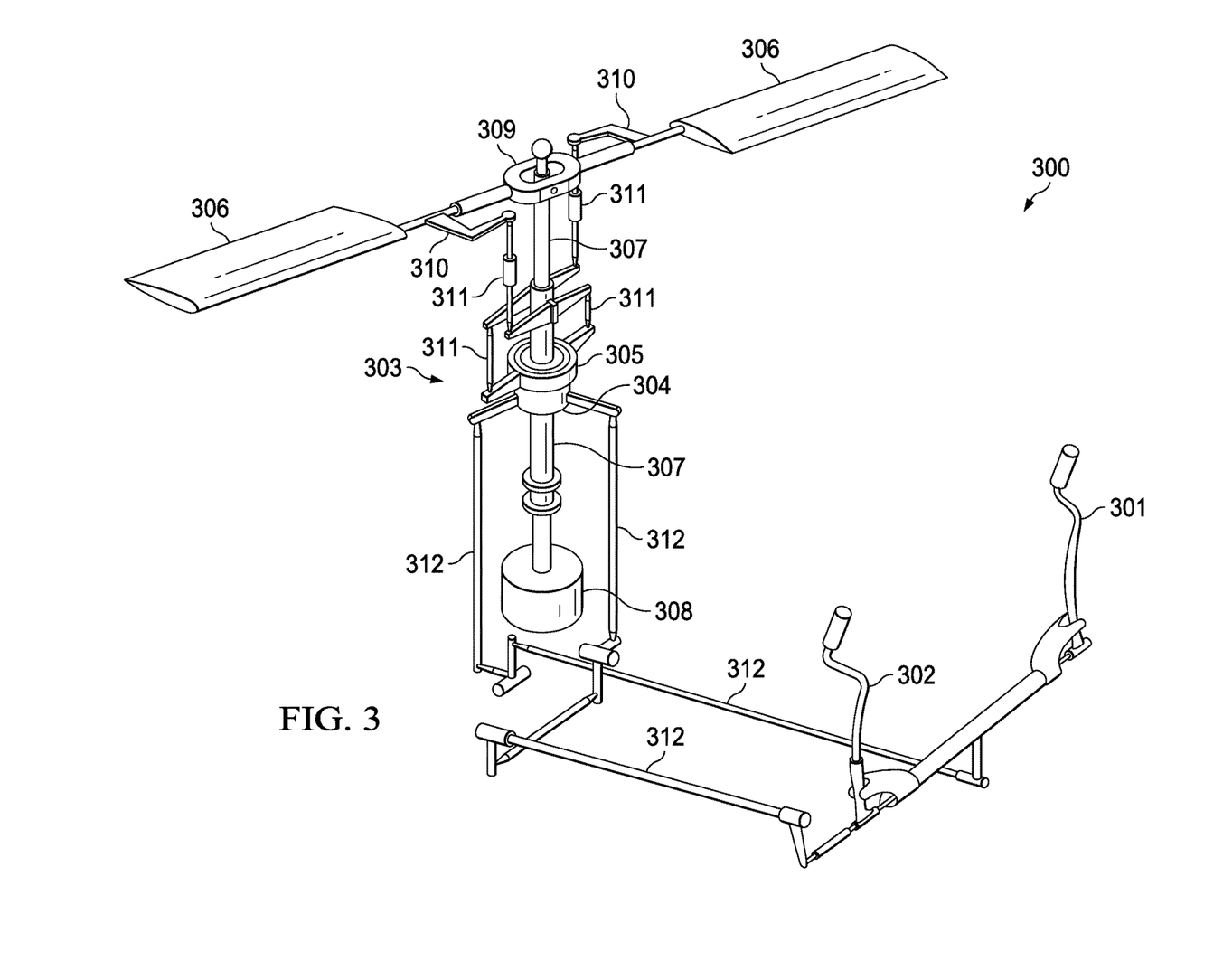
FIG. 3 illustrates a simplified rotorcraft flight control system for use with redundant impact-resistant structures according to an example embodiment.

FIG. 3 illustrates a simplified rotorcraft flight control system 300 for use with redundant impact-resistant structures according to an example embodiment. The example rotorcraft flight control system 300 connects cockpit control components 301, 302 (e.g., a cyclic controller or control stick) to a swashplate 303 of a rotorcraft. In some implementations, the cockpit control components 301, 302 are coupled to operate in tandem, such as for controls used by both a pilot and copilot. Swash plate 303 comprises a non-rotating lower plate 304 and a rotating upper plate 305. Swash plate 303 operates to translate movement of cockpit control components 301, 302 into changes in the pitch of rotor blades 306. Mast 307 is rotated by a transmission 308, which is in turn driven by an engine (not shown). Rotor blades 306 are coupled to mast 307 by a hub 309. When mast 307 is rotated by transmission 308, the rotor blades 306 are then rotated with mast 307. The angle or pitch of rotor blades 306 can be varied by moving rotor blade pitch control horns 310 up or down.

Pitch control horns 310 are coupled to the upper swash plate 305 by pitch links 311. When the upper swash plate 305 is tilted, the pitch links 311 translate that movement to pitch control horns 310, which cause the pitch of rotor blades 306 to increase or decrease. Upper swash plate 305 is tilted by movement of lower swash plate 304, which can be tilted simultaneously along both forward-backward and side-to-side axes. The movement of lower swash plate 304 is controlled by cockpit control components 301, 302 through control tubes 312 and various connecting linkages, bell cranks, etc. The control tubes 312 transmit control inputs from the cockpit control components 301, 302 to the swashplate 303. Additional control system elements, such as actuators, dampeners, delays, amplifiers, and stabilizers, may also be included in the rotorcraft flight control system 300 but are not shown in FIG. 3 to simplify the illustration.

Control tubes are found in many aircraft flight control systems such as to control the swash plate as shown above and/or to move other flight control surfaces. For example, control tubes may be used to move ailerons, flaps, slats, spoilers, elevators, or rudders. Control tubes are push-pull tubes that allow for transferring control movements through a single link (i.e., tube or rod) positively and in direct proportion to a control input. A single push-pull control tube can transfer tension and compression loads. Control tubes are a critical component of aircraft flight control systems.

Safety considerations require that the control tubes themselves do not break, bend excessively, or otherwise fail or become distorted. Control tubes in existing aircraft systems are typically either a hollow tube or a solid rod that has a design width or thickness to withstand expected operational loads plus some safety factor. However, existing control tubes present a single point of failure in aircraft control systems. If an existing control tube fails, such as by breaking, bending out of shape, or losing rigidity over time, then it is likely that the aircraft system in which the control tube is installed will also fail or be otherwise compromised.

Figure 4:
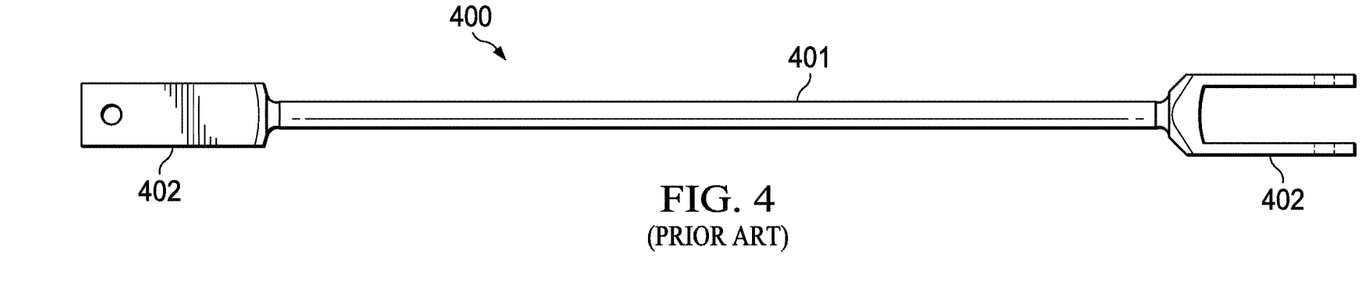
FIG. 4 illustrates an example prior art single-rod control link for an aircraft.

FIG. 4 illustrates an example prior art control link 400 for an aircraft. Control link 400 comprises a single, solid rod 401 that is attached to two end connectors 402.

Figure 5A:
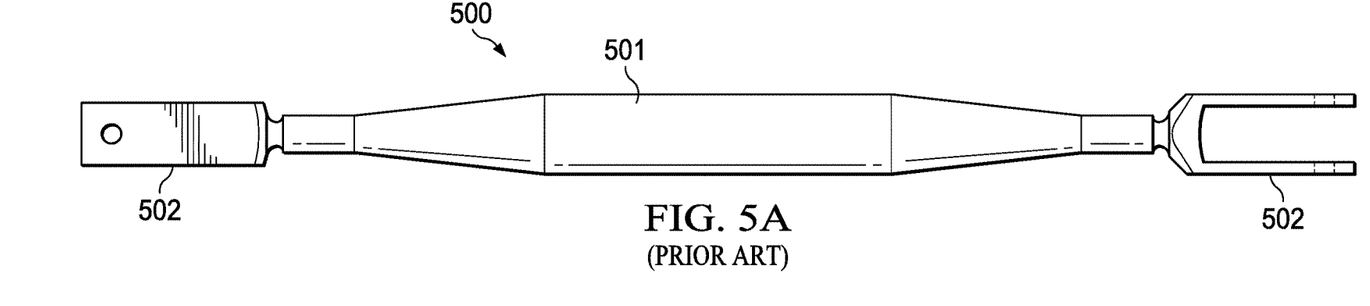
FIG. 5A illustrates a prior art control tube for an aircraft.
Figure 5B:
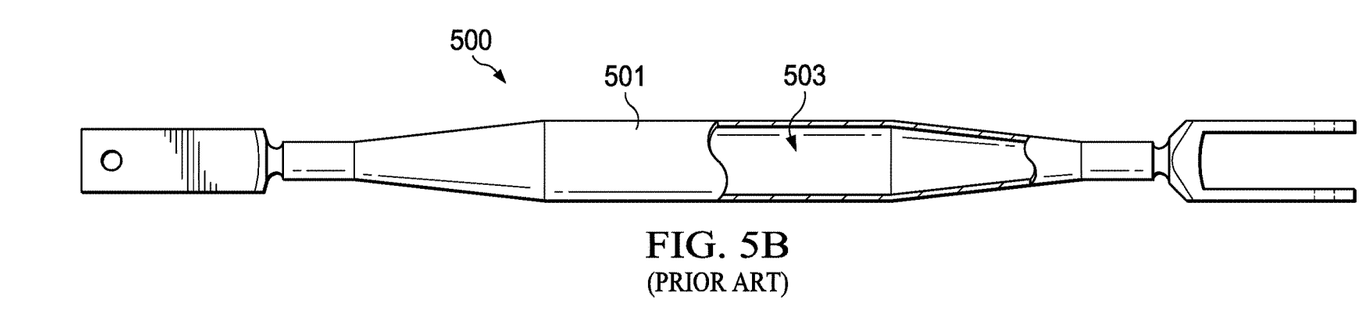
FIG. 5B is a cutaway view of the control tube shown in FIG. 5A.

FIGS. 5A and 5B illustrate another example of a prior art control link 500 for an aircraft. Control link 500 comprises a tube 501 that is attached to two end connectors 502. As shown in cutaway section 503, tube 501 is a hollow structure.

Control links 400 and 500 may be designed so that they are able handle the tension and compression forces that are expected in an aircraft flight control system. However, if rod 401 or tube 501 are damaged by an impact, break due to stress, or are otherwise deformed, then the entire control link 400 or 500 will fail. Failure of the control link 400 or 500 will then likely cause the aircraft flight control system in which the control link is installed to fail.

Figure 6A:
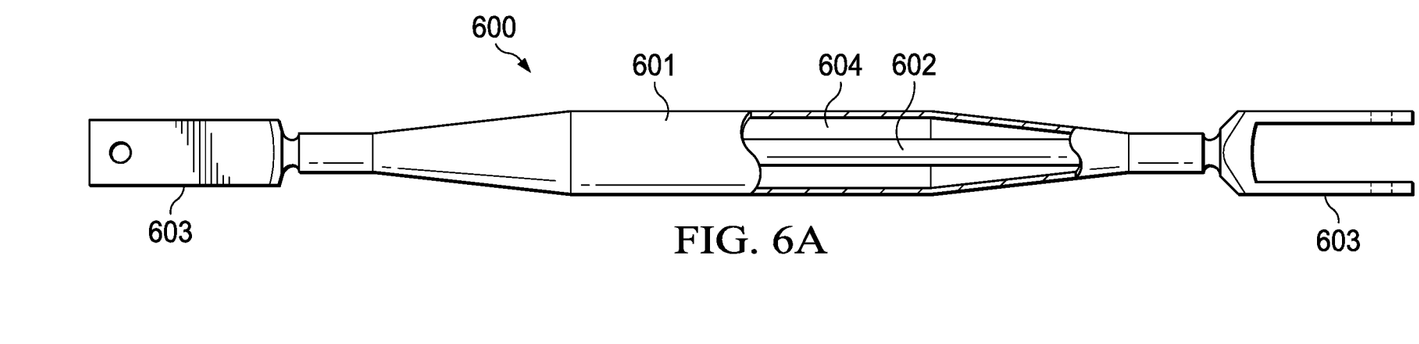
FIG. 6A is a cutaway view of a redundant impact-resistant control tube for an aircraft according to one embodiment.
Figure 6B:
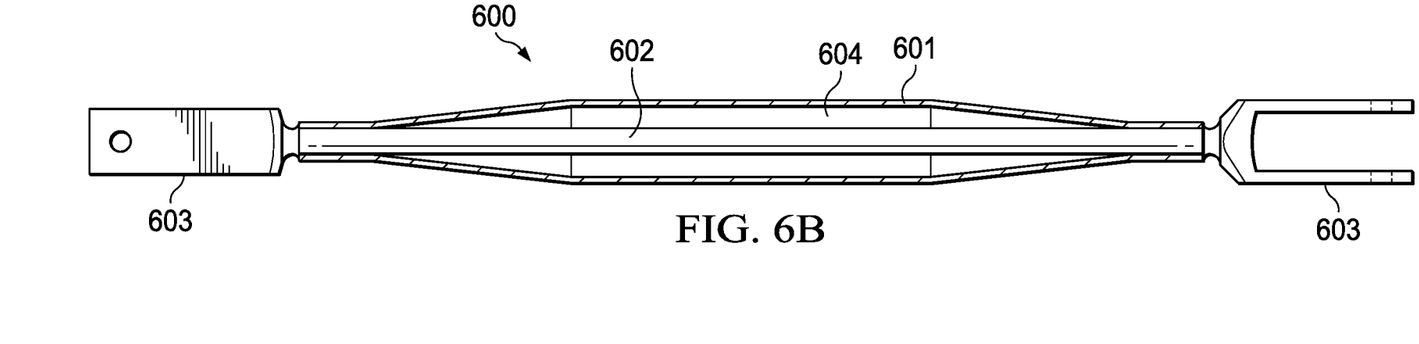
FIG. 6B is a cross-section view of the redundant impact-resistant control tube shown in FIG. 6A.

FIGS. 6A and 6B illustrate a redundant impact-resistant control tube 600 for an aircraft according to one embodiment. Control tube 600 overcomes the problems of prior art control links by providing an impact-resistant structure having a redundant load path. Control tube 600 comprises an outer structure 601 and an inner structure 602 attached to end connectors 603. Outer structure 601 is a hollow tube that is spaced apart from inner structure 602. Inner structure may be a hollow tube or a solid rod. Both outer structure 601 and inner structure 692 are attached to the end connectors 603 so that any load forces applied to control tube 600 are carried by both the outer structure 601 and an inner structure 602.

Outer structure 601 is designed to carry at least 100% of the compression and/or tension loads for the intended control system in which it will be used. Similarly, inner structure 602 is also designed to carry at least 100% of the compression and/or tension load for the intended system. This creates redundant load paths through both outer structure 601 and inner structure 602. Both outer structure 601 and inner structure 602 are designed to meet all system load requirements with appropriate safety factors. Additionally, outer structure 601 is sacrificial and absorbs any impact damage thereby protecting inner structure 602. If outer structure 601 fails, then inner structure 602 supports the required load and allows continued flight.

Outer structure 601 and inner structure 602 may be manufactured using aluminum, steel, or other metal, or a composite material. Outer structure 601 and inner structure 602 may be manufactured from the same material or from different materials. For example, while outer structure 601 and inner structure 602 may be designed to handle the same load forces, they may be manufactured from different materials to provide different wear patterns. If different materials are used to construct outer structure 601 and inner structure 602, then the structures may be subject to different wear types (e.g., mechanical, chemical, thermal) and/or wear processes (e.g., fracture, plastic flow, dissolution, oxidation, etc.), which may yield different wear rates or damage risks. Furthermore, since inner structure 602 is enclosed within, and therefore protected by, outer structure 601, inner structure 602 is not exposed to the same environmental factors as outer structure 601. Accordingly, while the material used for outer structure 601 may be designed to resist certain types of damage based on environmental conditions (e.g., oxidation, corrosion, etc.), the material used for inner structure 602 may not require those qualities since inner structure 602 is protected from the environment.

End connectors 603 may be manufactured from the same material as either outer structure 601 or inner structure 602 or from a different material. End connectors 603 may be any appropriate type of connector or attachment, such as a clevis end, a threaded rod end, self-aligning antifriction rod end, or the like. Both end connectors 603 may be of the same or different types depending upon the design of the flight control system and installation requirements.

Figure 7:
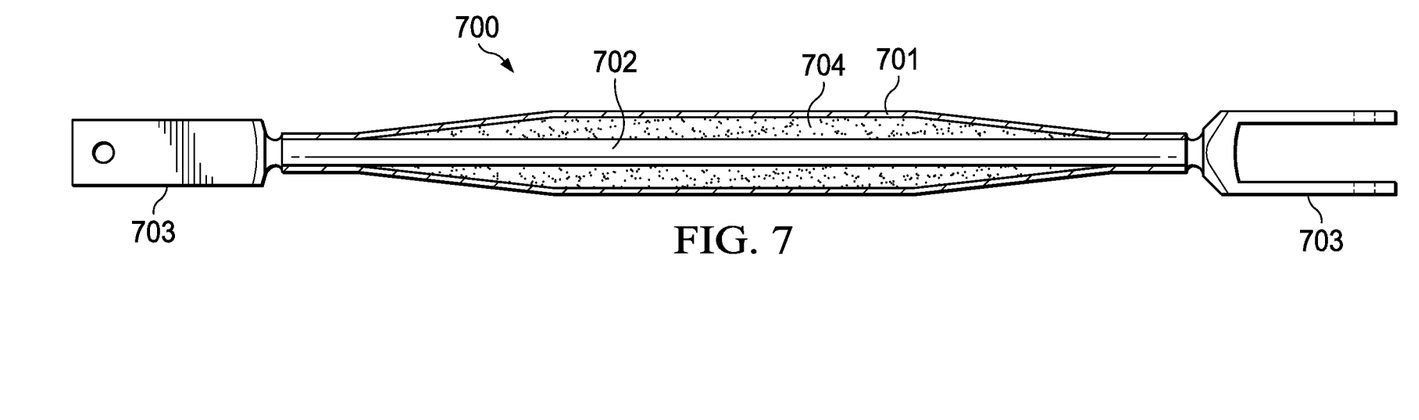
FIG. 7 illustrates a redundant impact-resistant control tube according to another embodiment.

The cavity 604 between the outer structure 601 and inner structure 602 is unfilled in example control tube 600. FIG. 7 illustrates a redundant impact-resistant control tube 700 for an aircraft according to another embodiment. Control tube 700 comprises an outer structure 701 and an inner structure 702 between end connectors 703. Outer structure 701 is a hollow tube that is spaced apart from inner structure 702. A filler 704 is included between outer structure 701 and inner structure 702. Filler 704 may be a shock absorbing, vibration dampening, insulating, or other material or barrier, such as a polyethylene closed-cell foam. In other embodiments, filler 704 may be a gas or liquid. Filler 704 may be used to protect inner structure 702, such as to prevent damage to outer structure 701 from propagating to inner structure 702. Alternatively, or additionally, filler 704 may be used to further isolate inner structure 702 from the environment and thereby minimize wear, aging, or other damage to inner structure 702.

Figure 8:
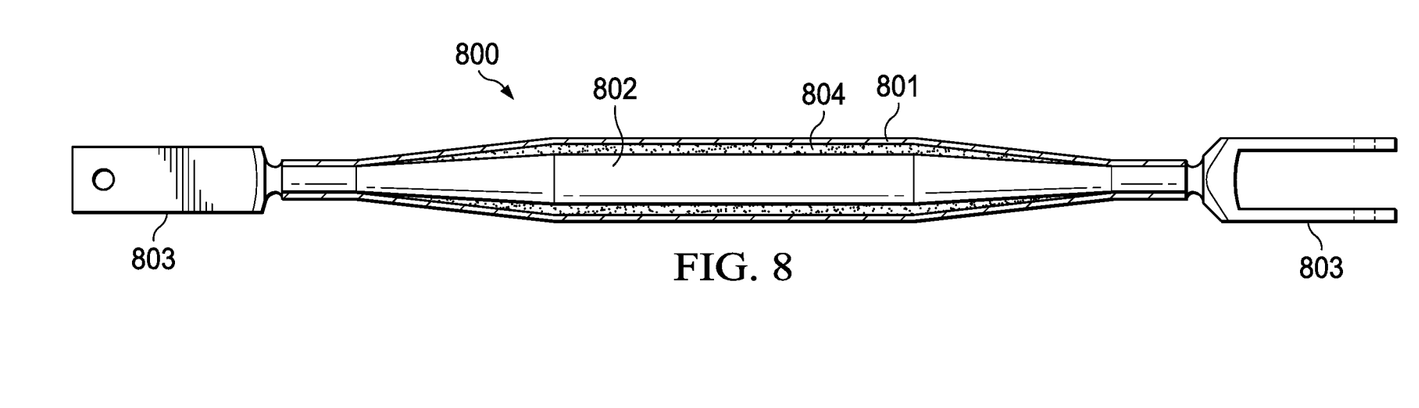
FIG. 8 illustrates another example of a redundant impact-resistant control tube.

The profile of the outer structure and the inner structure (i.e, size, shape, cross-section, etc.) may be similar or different. For example, in FIG. 7, the profile of outer structure 701 has a wide center section with tapered ends, while the inner structure 702 is a rod with a consistent width across the entire structure. FIG. 8 illustrates another example of a redundant impact-resistant control tube 800. Control tube 800 comprises an outer structure 801 and an inner structure 802 between end connectors 803. The profiles of outer structure 801 and inner structure 802 are similar wherein both have a wide center section with tapered ends. As a result, outer structure 801 is slightly spaced apart from inner structure 802, which provides less space for filler 804 compared to filler 704 in control tube 700.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. An aircraft flight control system configured to control flight of the aircraft in response to an aircrew input, the flight control system comprising:
    at least one redundant impact-resistant aircraft control link, comprising:
        a first elongated structure having a first end and a second end;
        a second elongated structure having a first end and a second end, the second elongated structure having a tubular shape with an inner wall, wherein the first elongated structure is disposed entirely within the second elongated structure and spaced apart from the inner wall;
        a first end connector attached both to the first end of the first elongated structure and to the first end of the second elongated structure, whereby load forces applied to the aircraft control link are carried by both the first elongated structure and the second elongated structure; and
        a second end connector attached both to the second end of the first elongated structure and to the second end of the second elongated structure, whereby load forces applied to the aircraft control link are carried by both the first elongated structure and the second elongated structure.

2. The aircraft flight control system of claim 1, further comprising:
    a filler positioned within the second elongated structure between the inner wall and an outer surface of the first elongated structure.

3. The aircraft flight control system of claim 2, wherein the filler is a shock-absorbing material.

4. The aircraft flight control system of claim 2, wherein the filler is a closed-cell foam.

5. The aircraft flight control system of claim 2, wherein the filler is a vibration-dampening material.

6. The aircraft flight control system of claim 1, wherein the first elongated structure is a solid structure.

7. The aircraft flight control system of claim 1, wherein the first elongated structure is a hollow structure.

8. A rotorcraft, comprising:
    a fuselage;
    an engine carried by the fuselage;
    a rotor system including a rotor hub and rotor blades, the rotor system coupled to the engine;
    a flight control system coupled to the rotor system and configured to control a pitch of the rotor blades in response to an aircrew input, the flight control system comprising at least one redundant impact-resistant aircraft control link, wherein the control link comprises:
        a first elongated structure having a first end and a second end;
        a second elongated structure having a first end and a second end, the second elongated structure having a tubular shape with an inner wall, wherein the first elongated structure is disposed entirely within the second elongated structure and spaced apart from the inner wall;

a first end connector attached both to the first end of the first elongated structure and to the first end of the second elongated structure, whereby load forces applied to the aircraft control link are carried by both the first elongated structure and the second elongated structure; and a second end connector attached both to the second end of the first elongated structure and to the second end of the second elongated structure, whereby load forces applied to the aircraft control link are carried by both the first elongated structure and the second elongated structure.

9. The rotorcraft of claim 8, further comprising:
a filler positioned within the second elongated structure between the inner wall and an outer surface of the first elongated structure.

10. The rotorcraft of claim 9, wherein the filler is a shock-absorbing material.

11. The rotorcraft of claim 9, wherein the filler is a closed-cell foam.

12. The rotorcraft of claim 9, wherein the filler is a vibration-dampening material.

13. The rotorcraft of claim 8, wherein the first elongated structure is a solid structure.

14. The rotorcraft of claim 8, wherein the first elongated structure is a hollow structure.

15. The rotorcraft of claim 8, wherein the control link is configured to support a design load within the flight control system, and both the first elongated structure and the second elongated structure are capable of supporting the design load individually.

16. The rotorcraft of claim 15, wherein the design load is compression load or a tension load or both.

17. The aircraft flight control system of claim 1, wherein the control link is configured to support a design load within a flight control system of the aircraft, and both the first elongated structure and the second elongated structure are capable of supporting the design load individually.

18. The control link of claim 17, wherein the design load is compression load or a tension load or both.

19. An aircraft, comprising:
a fuselage;
an engine carried by the fuselage;
an aircraft flight control system configured to control flight of the aircraft in response to an aircrew input, the flight control system comprising at least one redundant impact-resistant aircraft control link, wherein the control link comprises:
a first elongated structure having a first end and a second end;
a second elongated structure having a first end and a second end, the second elongated structure having a tubular shape with an inner wall, wherein the first elongated structure is disposed entirely within the second elongated structure and spaced apart from the inner wall;
a first end connector attached both to the first end of the first elongated structure and to the first end of the second elongated structure, whereby load forces applied to the aircraft control link are carried by both the first elongated structure and the second elongated structure; and
a second end connector attached both to the second end of the first elongated structure and to the second end of the second elongated structure, whereby load forces applied to the aircraft control link are carried by both the first elongated structure and the second elongated structure.

20. The aircraft of claim 19, wherein the control link is configured to support both a compression load and a tension load within the flight control system, and both the first elongated structure and the second elongated structure are individually capable of supporting both the compression load and the tension load.

* * * * *